United States Patent [19]

Reimann et al.

[11] Patent Number: 4,746,335

[45] Date of Patent: May 24, 1988

[54] DEGASIFIER

[75] Inventors: Jörg Reimann, Karlsruhe; Hans-Jörg Brinkmann, Gondelsheim, both of Fed. Rep. of Germany

[73] Assignee: Kernforschungszentrum Karlsruhe GmbH, Karlsruhe, Fed. Rep. of Germany

[21] Appl. No.: 101,140

[22] Filed: Sep. 25, 1987

[30] Foreign Application Priority Data

Oct. 1, 1986 [DE] Fed. Rep. of Germany ....... 3633379

[51] Int. Cl.$^4$ .............................................. B01D 19/00
[52] U.S. Cl. ....................................... 55/170; 55/185; 55/190
[58] Field of Search ................. 55/165, 170, 185, 190, 55/199

[56] References Cited

U.S. PATENT DOCUMENTS

| 812,831 | 2/1906 | Davidson | 55/170 X |
|---|---|---|---|
| 1,631,454 | 6/1927 | Bombach et al. | 55/170 X |
| 2,671,524 | 3/1954 | Gilwood | 55/165 X |
| 3,247,650 | 4/1966 | Konnbichler | 55/185 |
| 3,460,319 | 8/1969 | Trach | 55/190 X |
| 3,626,672 | 12/1971 | Burbidge | 55/185 |

Primary Examiner—Charles Hart

[57] ABSTRACT

In a degasifier for the separation of gases and vapors from gas-liquid and vapor-liquid mixtures flowing through a pipeline there is provided at the bottom of a housing a pipe section connected into the pipeline with a branch conduit connected to the top of the pipe section and extending upwardly therefrom for the delivery of gas or vapor-laden liquid mixtures to the upper part of the housing. The pipe section has bottom openings for the return of liquid discharged through the branch conduit and liberated from the gases or vapors to the pipe section and the pipeline.

7 Claims, 4 Drawing Sheets

DEGASIFIER

BACKGROUND OF THE INVENTION

The present invention relates to a degasifier for the removal of gases or vapors from fluid flows including vapors or gases.

Fluid streams including mixtures of gases or vapors with liquids occur in many technical processes. In most cases it is advantageous if the gas or vapor content of the fluid stream can be substantially reduced. Examples are:

(a) Crude oil pumping:

The oil pumped usually contains an undesirably large amount of gases which greatly increases the pressure losses in the pipeline and consequently reduces the pumping performance. Also flow surges may occur in the pipeline which cause high mechanical stresses in the pipeline and may lead to failure of the pipeline. Such flow surges are especially objectionable at the end of an oil pipeline leading from an oil field to an off-shore but also an on-shore plant. In order to avoid such flow surges in the plant equipment, there are provided surge suppressors which are quite large and expensive.

(b) Evaporators:

In the evaporation of liquids the heat transfer is substantially better if the vapor content of the liquid is only small, that is, if only small vapor bubbles are present in the liquid, than it is when the vapor content, is relatively high. The provision of equipment which reduces the vapor content of the liquid permits a reduction of the required amount of heat exchange surfaces and of the pumping power which therefore increases the efficiency of the plant.

Conventional gas-liquid separators such as cyclones, containers with large surfaces, etc., have a large volume and therefore require a substantial amount of space and therefore are relatively expensive.

German Pat. No. 3,419,159 discloses a degasificatier which is associated with a pipe section and has a container disposed above the pipe section and a branch tube providing for communication between the pipe section and the container.

It is the principal object of the present invention to provide an improved arrangement which is simpler in design and which results in a substantially increased separation efficiency.

SUMMARY OF THE INVENTION

The stated object is achieved by a degasifier for the separation of gases and vapors from gas-liquid or vapor-liquid mixtures flowing through a pipeline which has at the bottom of its housing a pipe section extending therethrough and connected into the pipeline with a branch conduit connected to the top of the pipe section and extending upwardly therefrom for the discharge of gas or vapor-laden liquid mixtures from the top of the pipe section into the upper part of the housing where the mixtures separate and the gases or vapors liberated from the liquid are discharged through a discharge nozzle while the liquid is collected in the housing and re-enters the pipe section and the pipeline through openings formed in the lower part of the pipe section within the degasifier housing.

With this arrangement the power required fro rising the mixture into the housing and returning the gas-free liquid to the pipeline is provided by lifting force generated by the gas in the branch conduit before its separation from the liquid so that no external power is required and no pressure losses are encountered for the operation of the degasifier.

A degasifier, that is, a gas separation apparatus in accordance with the invention, is very compact, has no moving parts and requires no direct energy input. It may simply be built into a pipeline, causes only little pressure losses, is of much simpler design than known apparatus and yet exhibits substantially improved gas separation efficiency.

Deflection of the flow is achieved in a simple manner in a branch by a pressure differential imposed on the flow. This provides for excellent gas separation while the liquid after separation of the gases therefrom is returned to the main flow. It is particularly advantageous that the pressure losses in a pipeline utilizing the invention are smaller than in prior art arrangements, and that surge-type flows are avoided. Also, if used in connection with a flow of a steam and water mixture, the heat exchanger surface areas of evaporators, for example, may be relatively small since the heat exchange of water is better when it does not contain any steam.

SHORT DESCRIPTION OF THE DRAWINGS

DESCRIPTION OF A PREFERRED EMBODIMENT

Figure 1:
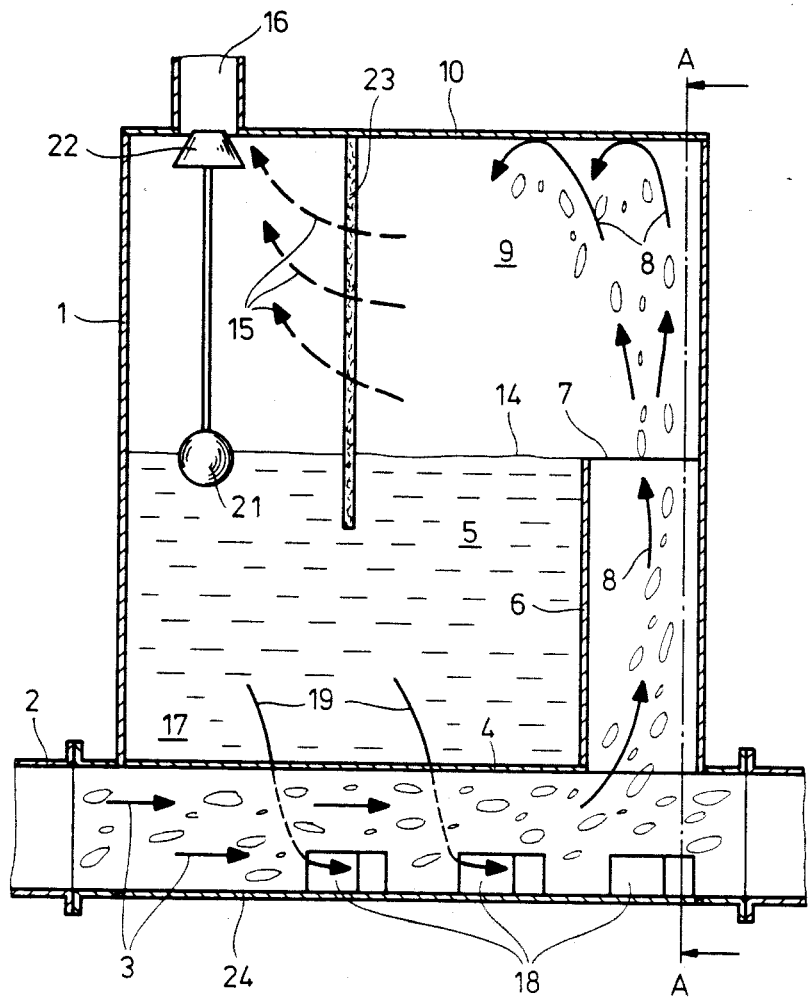
FIG. 1 is a cross-sectional view of the apparatus showing the operating principle.
Figure 2:
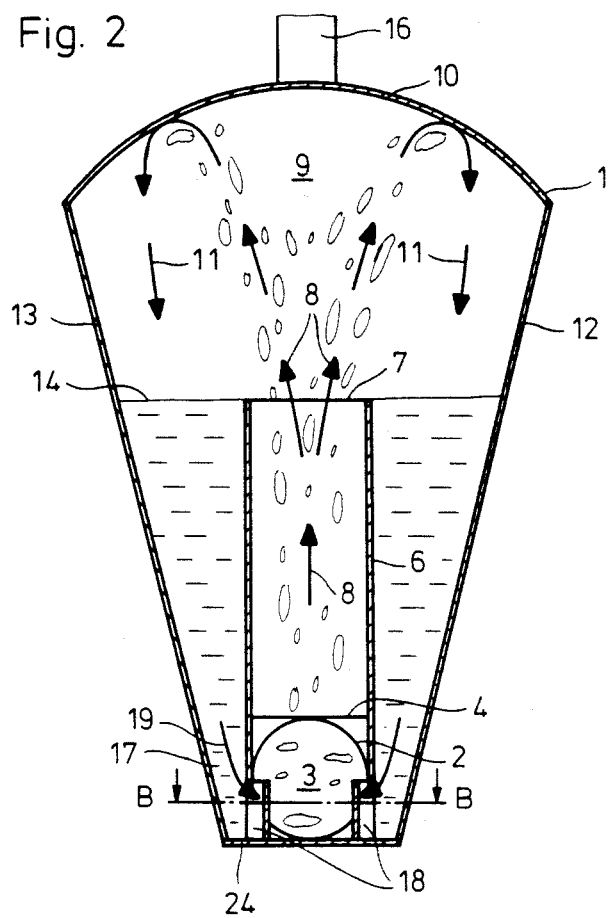
FIG. 2 is a sectional view along line A—A of FIG. 1.
Figure 3:
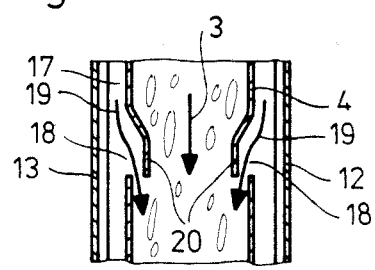
FIG. 3 is a sectional view along line B—B of FIG. 2.
Figure 4:
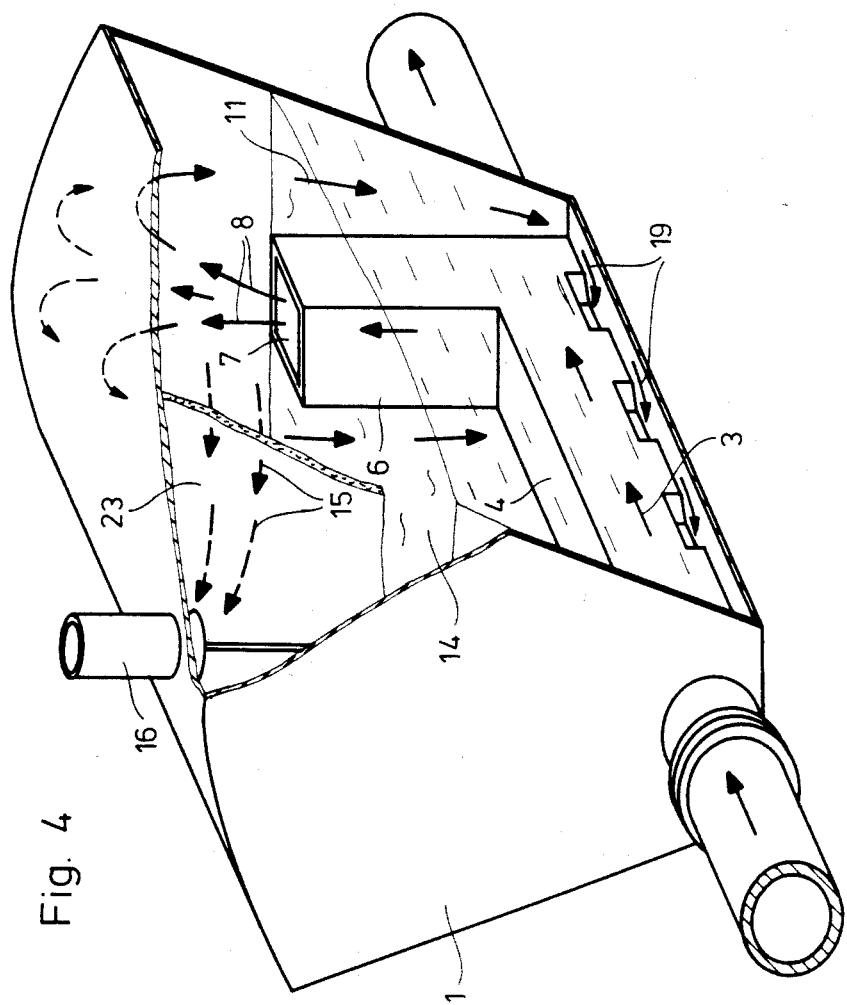
FIG. 4 is a perspective view of the apparatus with part of its wall removed.

A degasifier as shown in FIG. 1 consists of a housing 1 which is disposed essentially above a horizontal pipe 2 conducting a flow of a liquid-gas mixture 3, which passes through the bottom part of the housing 1. The housing 1 is flanged into the pipe 2 and the respective pipe section 4 within the housing 1 is preferably of square cross-section with edges of a length corresponding essentially to the diameter of the pipe 2. At the downstream end 5 of the housing 1 the pipe section 4 has a vertically extending branch conduit 6 which may also be of square cross-section and which has a height of three times its width. The housing 1 is wider than the branch conduit 6, which at its top end has an opening 7 through which a fluid portion 8 flowing upwardly together with and driven by gases is discharged into the upper part 9 of the housing 1. The housing 1 has an arched cover 10 which serves as a deflecting plate for the fluid 8 ejected from the branch conduit 6. After impinging onto the cover 10 the liquid portion falls downwardly to the liquid surface 14, as indicated by arrows 11, along the side walls 12 and 13 of the housing (see FIG. 2) while the gases (arrows 15) move to the gas discharge nozzle 16.

Within the lower part 17 of the housing 1 there are provided in the lower part of the pipe section 4 side openings 18 which may also be formed so as to provide an injector structure and through which the liquid from the lower housing part 17 flows back into the pipe section 4 as indicated by arrows 19, that is, back into the mixture flow 3. The injectors may consist of guide baffles 20 provided in the pipe section 4 adjacent the side openings 18. The openings are arranged adjacent the branch conduit 6 and somewhat upstream thereof. There may be one, two or more such openings 18.

A float 21 provided with a valve head 22 is supported in the housing 1 so as to float on the liquid therein and to close the gas discharge nozzle 16 when the liquid surface 14 reaches a predetermined level. Between the discharge nozzle 16 and the branch conduit 6 there is arranged in the upper housing part 9 a liquid separator 23 which extends from the housing cover 10 down into the liquid so that all the gases released from the liquid have to pass therethrough in order to reach the discharge nozzle 16 in order to prevent liquid droplets from being carried out of the discharge nozzle with the gases discharged therethrough.

The operation of the degasifier is as follows:

Because of the liquid column collected in the housing 1, the pressure in the upper housing part is somewhat smaller than in the pipe section 4 or in the pipe 2. A large part of the gas concentrating in the upper part of the pipe section 4 enters the vertical branch conduit 6 and provides therein during operation of the apparatus a fluid mixture with a relatively high gas content, that is, with relatively low density, especially when compared with the gas-free liquid in the lower housing part 17. This generates a strong upward flow of the fluid portion 8 within the vertical branch conduit 6.

In the upper housing part 9 liquid and gas are separated, the liquid falling down into the lower housing part 17 and the gas flowing toward the discharge nozzle 16 thourhg the separator 23 in which any droplets carried along by the gas are separated therefrom. The gas is discharged from the housing 1 through the discharge nozzle 16. The liquid falls downwardly as indicated by arrows 11 and is collected in the lower housing part 17. The amount of gas discharged, and as a result the pressure within the upper housing part 9 and amount of flow through the vertical branch conduit 6, is controlled by the float 21-operated valve body 22 such that the liquid level is about even with the top edge, that is, the discharge opening 7 of the branch conduit 6. If the liquid level rises, the valve head 22 closes the discharge nozzle 16 which causes a slight pressure rise within the upper housing part 9 that results in a reduction of flow through the vertical branch conduit 6. If the liquid level falls the discharge nozzle is fully opened correspondingly.

In place of a liquid level control by means of a float and valve arrangement as described, there may be provided a control arrangement utilizing a liquid level sensor and an associated gas flow control valve somewhere within a gas discharge pipe connected to the gas discharge nozzle 16.

The height of the liquid level within the lower housing part, that is, the hydrostatic pressure provided thereby, is essentially the operating force for the re-turn of the liquid into the pipe section 4. The liquid returns into the pipe section 4 through the openings 18, the return flow being enhanced by the injector shape of the openings. Arrangement of the openings 18 at the side of the pipe section 4 and at the bottom 24 of the lower housing part 17 is advantageous in order to prevent deposits of, for example, sand therein, which deposits may be carried alaong with the flow through the vertical pipe. The deposits are then carried back into the main stream within the pipe section 4. It is also noted that return of the gas-free liquid into the pipe section 4 before the branch conduit connection forces the gas-laden stream to the upper part of the pipe section 4 and into the branch conduit 6 far improved overall separation results.

Figure 5:
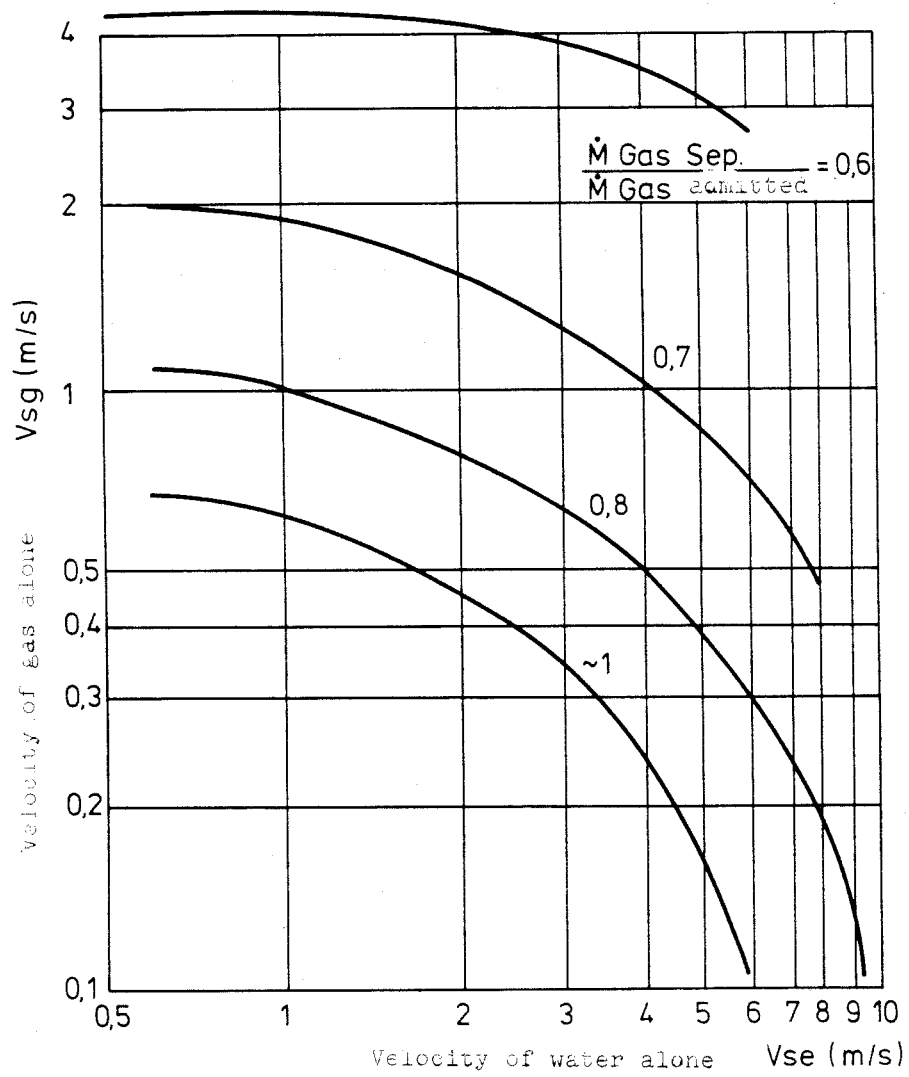
FIG. 5 shows a diagram giving operating characteristic curves of a single stage gasifier with an air/water mixture ($p=4$ bar, $d=50$ mm).

FIG. 5 shows characteristic operating curves extrapolated from measurement of an air-water stream of a pressure of $p_1 = 4$ bar in a single-stage apparatus. Given in the Figure are curves for the same relation of separated gas stream mass $m_{sep}$ to the main flow gas stream mass $m_1$. The characteristic curves show that even with dispersed bubble flow, that is, with a relatively large amount of gas in the flow mixture, the apparatus still provides for a separation efficiency of 60%. In the technically more interesting range in which surge flow occurs ($V_{sl} < 4$ m/s) and the range in which oscillation flow occurs ($V_{sl} < 0.25$ m/s) the efficiency greatly improves.

The essential features of the degasifier according to the invention are these:

A pipe section 4 mounted in the pipeline 2 and enclosed in a housing 1 which extends essentially above the pipe section 4 has a cross-sectional area which is substantially larger than that of the pipe section 4. A branch conduit 6 connected to the pipe section 4 and extending upwardly therefrom directs a gas mixture from the pipe section 4 into the upper part of the housing 1 which returns the liquid of the mixture back into the pipe section 4 and the pipeline 2 through openings 18 in the lower part of the pipe section 4 at the bottom 24 of the lower housing part 17. The top of the housing 1 is formed by an arched cover 10 which is arranged at a distance above the opening 7 of the branch conduit 6. The pipe section is disposed at the bottom 24 of the housing 1 and the openings 18 are arranged at the lower end of its side walls just above the housing bottom 24. They are arranged below, and/or upstream of, the branch conduit 6.

REFERENCE NUMERALS

1: Housing
2: Pipe
3: Liquid-gas mixture flow
4: Pipe section
5: Downstream end of housing
6: Branch conduit
7: Opening
8: Fluid portion
9: Upper housing part
10: Housing cover
11: Downstream indicating arrows
12: Side wall
13: Side wall
14: Liquid surface
15: Arrows indicating gas flow
16: Gas discharge nozzle
17: Lower housing part
18: Side openings
19: Arrows
20: Guide baffles
21: Float
22: Valve head
23: Separator
24: Housing bottom

What is claimed is:

1. A degasifier for the separation of gases and vapors from gas-liquid and vapor-liquid mixture streams within a pipeline, comprising:

(a) a housing;

(b) a pipe section extending across said housing and having means for connection in said pipeline, said housing having a cross-section substantially larger than said pipe section;

(c) an upwardly projecting branch conduit connected to said pipe section for the delivery of gas or vapor-liquid mixtures from said pipe section to the interior of said housing;

(d) said pipe section having openings providing for communication with the lower part of the housing interior for the return of the liquid from said housing interior to said pipeline; and (e) said housing having a cover arranged in spaced relationship above a top opening of said branch conduit.

2. A degasifier according to claim 1, wherein said pipe section is disposed directly above the bottom of said housing and said openings are formed in the lower side walls of said pipe section directly adjacent the housing bottom.

3. A degasifier according to claim 1, wherein the openings in said pipe section are arranged below, and upstream of, said branch conduit.

4. A degasifier according to claim 2, wherein the openings in said pipe section are arranged below, and upstream of, said branch conduit.

5. A degasifier according to claim 1, wherein said housing has a gas discharge nozzle in the upper part thereof and a float is provided in said housing and has a valve head associated therewith so as to close said discharge nozzle when the liquid in said housing reaches a predetermined level.

6. A degasifier according to claim 1, wherein said housing has a gas discharge nozzle in the upper part thereof remote from said branch conduit and a droplet separator extends across the upper part of said housing from said cover downwardly into the liquid in the lower part of said housing such that any gases or vapors discharged from said branch conduit need to pass through said separator before entering said discharge nozzle.

7. A degasifier according to claim 1, wherein said housing cover is arched.

* * * * *